H. C. PERKINS.
HYDRAULIC NOZZLE.
No. 7,315 Reissued Sept. 19, 1876.
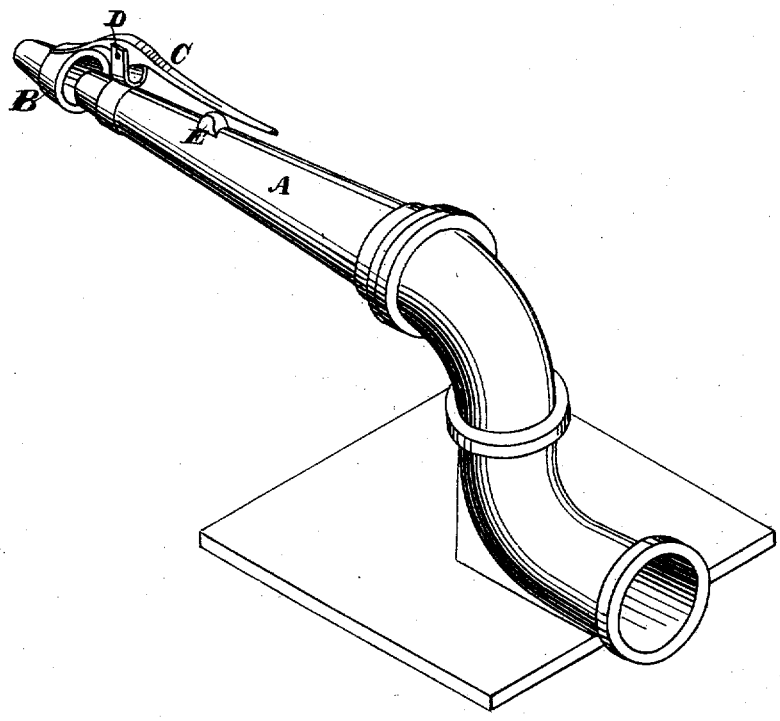
Witnesses
Geo. H. Strong.
Olwyn T. Stacy
Inventor
Henry C. Perkins
By his atty's
Dewey & Co.
N. PETERS, PHOTO-LITHOGRAPHER, WASHINGTON, D. C.

UNITED STATES PATENT OFFICE.

HENRY C. PERKINS, OF NORTH BLOOMFIELD, CALIFORNIA.

IMPROVEMENT IN HYDRAULIC NOZZLES.

Specification forming part of Letters Patent No. 177,419, dated May 16, 1876; reissue No. 7,315, dated September 19, 1876; application filed August 29, 1876.

*To all whom it may concern:*

Be it known that I, HENRY C. PERKINS, of North Bloomfield, Nevada county, State of California, have invented Improvements in Operating Hydraulic Nozzles; and I do hereby declare the following description and accompanying drawings are sufficient to enable any person skilled in the art or science to which it most nearly appertains to make and use my said invention or improvement, without further invention or experiment.

My invention relates to a novel method of moving the discharge-nozzles of hydraulic machines from side to side, or so as to point in any desired direction; and this I effect by means of the deflecting power of the streams upon the nozzle itself, through the intervention of suitable devices, which are readily operated, so that the stream will operate them from any desired direction.

Referring to the accompanying drawings for a more complete explanation of my invention, Figure 1 is a perspective view.

A is the discharge pipe or nozzle of a hydraulic machine, such as is used for washing down banks in what are known as gravel gold-diggings.

These nozzles are usually of large diameter, and water is brought to them under great pressure, so that it is very difficult to move the universal joint with which they are constructed, and many devices comprising powerful levers have been used for the purpose. I have found, however, that by suitably-manipulated tubes, plates, or rifles, the force of the stream issuing from the nozzles may be made to turn the pipe in any direction without the use of any other device.

This term nozzle is intended to describe the whole device or pipe, and not merely the discharge-opening at the end.

In the present case I have shown a short section of the tube B, which may be somewhat larger than the nozzle, (that is, if the nozzle be six inches in diameter, the interior diameter of the tube may be seven inches,) so that when mounted upon the pipe, just beyond or about the end of the nozzle, the stream of water will pass through it without touching; but, if the tube be turned to either side, the force of water acting against the side will cause the whole nozzle to move in that direction.

In order to mount the tube, so as to move it readily in any direction, I have secured it to one arm of a lever, C, while the other arm extends back along the line of pipe. The fulcrum of the lever is supported upon a swivel-joint, D, which is capable of being turned in any direction. This joint is supported from a ring surrounding the nozzle, or gimbals may be fitted to support the deflecting nozzle.

It will readily be seen that distinct deflecting plates may be substituted for the nozzle or tube; or in some cases a rifle or plate might be mounted like a butterfly-valve upon an arm passing through the side of the nozzle near its end, so as to stand in the stream, and by turning this plate from side to side the desired effect might be produced. A rest, E, serves to support the lever C and retain the deflector in a straight line when not needed.

By this means I do away with the powerful mechanism needed to operate these large nozzles, and reduce the labor so that a child could manage the largest machine.

Having thus described my invention, what I claim, and desire to secure by Letters Patent, is—

The method of moving the discharge-nozzles of hydraulic machines so as to point in any direction, the same consisting in the application of the deflecting power of the stream of water passing through the discharge-pipe upon a suitable deflecting device, substantially as herein described.

In witness whereof I hereunto set my hand and seal August 8, 1876.

H. C. PERKINS. [L. S.]

Witnesses:

A. E. SMITH,

R. D. SKIDMORE.